United States Patent [19]

Battson

[11] Patent Number: 4,574,313

[45] Date of Patent: Mar. 4, 1986

[54] CASCADED CCD SHIFT REGISTERS HAVING DIFFERENT NUMBERS OF CLOCKING PHASES

[75] Inventor: Donald F. Battson, Landisville, Pa.

[73] Assignee: RCA Corporation, Princeton, N.J.

[21] Appl. No.: 680,847

[22] Filed: Dec. 12, 1984

[51] Int. Cl.[4] .............................................. H04N 3/15
[52] U.S. Cl. ...................................... 358/213; 357/24
[58] Field of Search .................. 358/213, 209, 41, 44; 357/24 LR; 250/578; 377/78, 87; 307/311, 607

[56] References Cited

U.S. PATENT DOCUMENTS

| 3,801,884 | 4/1974 | Sequin | 317/235 R |
| 4,280,141 | 7/1981 | McCann et al. | 358/213 |
| 4,481,538 | 11/1984 | Battson et al. | 358/213 |
| 4,507,684 | 3/1985 | Battson | 358/213 |

Primary Examiner—Thomas W. Brown
Assistant Examiner—Robert G. Lev
Attorney, Agent, or Firm—Joseph S. Tripoli; George E. Haas; Allen L. Limberg

[57] ABSTRACT

A cascade connection of first and second CCD shift registers having clocking signals with equal cycle durations, but with m phases and n phases respectively, where m is a larger positive integer than n.

3 Claims, 10 Drawing Figures

CASCADED CCD SHIFT REGISTERS HAVING DIFFERENT NUMBERS OF CLOCKING PHASES

The present invention relates to cascaded charge-coupled-device (CCD) shift registers.

BACKGROUND OF THE INVENTION

CCD imagers of the field transfer type have an image register comprising an array of parallelled charge transfer channels in which charge packets are accumulated during image integration time intervals. The charge that is accumulated is generated by photoconversion of elements of a radiant energy image impinging upon the array. During the integration time intervals it is common practice to apply static clocking signals to a plurality of gate electrodes arranged in succession across the parallelled charge transfer channels of the image register, to define boundaries for the image elements. These imagers also have a field storage register comprising an array of parallelled charge transfer channels shielded from radiant energy, with gate electrodes arranged in succession across the parallelled charge transfer channels thereof.

During field transfer intervals, the charge packets representative of the intensity of respective image elements are transferred from the parallelled charge transfer channels of the image register to respective ones of the parallelled charge transfer channels of the field storage register. This is done by applying dynamic clocking signals to the gate electrodes of the image and field storage registers, to operate the charge transfer channels of the image register as CCD shift registers to supply lines of charge packets in parallel at their output ends, and to operate the charge transfer channels of the field storage register as CCD shift registers to receive respective ones of the charge packets at their input ends. That is, each charge transfer channel in the image register and a corresponding charge transfer channel in the field storage register following are operated as a cascade connection of CCD shift registers. The rate of dynamic clocking of the image and field storage registers during these field transfer times is generally relatively high, so that complete transfer of a field of charge packets representative of image element intensity can be carried out during field retrace times.

During the ensuing field trace time the image register again receives static clocking signal; and at least a portion, if not all, of the field trace time is included in the next image integration time interval. In the field trace time lines of charge packets are advanced a row at a time during line retrace time through the field storage register. The line of charge packets transferred in parallel out of the field storage register charge transfer channel each line retrace time is converted by an output line register to appear serially in time during the ensuing line trace time.

Until now the standard diagonal dimension of the image register in a CCD imager designed for broadcast television camera use has been eight millimeters and three phase clocking of a 480 lines or so image register has kept gate electrode length below the seven microns or so maximum associated with acceptable graininess of the CCD imager video output signal. There is a strong commercial impetus, however, to develop CCD imagers with eleven millimeters diagonal dimension so the same camera optics could be used that has been developed for vidicons. The larger image elements require that the number of clocking phases in the image register be increased so that gate electrode length can be held to the seven micron maximum to avoid excessive graininess. It would be preferable to increase the number of clock phases to an even number, such as four or six, to implement providing perfect line interlace between alternate field scans.

In prior art CCD imagers of field transfer type the synchronous clocking of the image and field storage registers has been implemented by clocking the registers with the same number of clocking phases. E.g., in the broadcast camera CCD imagers both the image and field storage registers use three-phase clocking, wherein every third gate electrode in the succession of gate electrodes spanning the parallelled charge transfer channels of an array CCD register receives the same phase of clocking signal, lagging the phase of clocking signal received by the preceding gate electrode, and leading the phase of clocking signal received by the succeeding gate electrode.

However, while it is a practical necessity to increase the number of phases of clocking signal applied to the image register upwards from three, it would be preferable not to have to increase the number of phases of clocking signal applied to the field storage register from three. This preference arises from the desire to avoid the problems of having to bus the extra clocking phases across the CCD imager.

The field storage register, unlike the image register, normally does not have anti-blooming drains between its charge transfer channels. So the charge transfer channels in the field storage register can be made wider than those in the image register. Accordingly, when this is done the dynamic range of equal length charge transfer stages (directly related to charge storage capabilities of the stages) is greater in a three-phase field storage register than in a three-phase image register.

Increasing the number of clocking phases in the image register makes the two phases of clocking, which must at times be simultaneously erecting barrier potentials in the image register to implement forward transfer of charge, a smaller portion of the total number of clocking phases. This plus the fact that pixel size is increased for given gate electrode length, if the number of gate electrodes per charge transfer stage is increased, increases the dynamic range of the image register vis-a-vis the three-phase field storage register. Matching the dynamic ranges of the image and field storage register charge transfer stages provides a better imager sensitivity for given area on the semiconductor die.

SUMMARY OF THE INVENTION

The invention is embodied in a cascade connection of CCD shift registers clocked in synchronism with each other, but with the preceding CCD register in the cascade connection clocked with a larger number of clocking phases than the succeeding CCD shift register. The phasing of the two sets of clock phases is arranged to avoid merger of successive charge packets as they are shifted from the preceeding to the succeeding CCD shift register. A particularly useful embodiment of the invention is in a CCD imager of field transfer type with an image register of larger than eight millimeter diagonal dimension synchronously clocked in more than three clocking phases during field transfer to a field storage register clocked in only three clocking phases.

BRIEF DESCRIPTION OF THE DRAWING

FIG. 1 is a block diagram of a cascade connection of CCD shift registers wherein in accordance with the invention the preceding shift register is clocked in a number m of clocking signal phases greater than the number n of clocking signal phases the succeeding shift register is clocked in.

DETAILED DESCRIPTION

Figure 1:
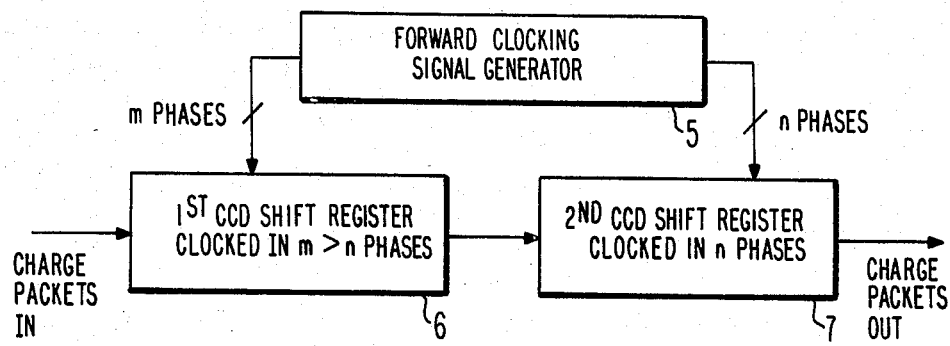

FIG. 1 shows a clocking signal generator 5 supplying forward clocking signals to a first CCD shift register 6 followed in cascade connection by a second CCD shift register 7. Charge packets are introduced into CCD shift register 6 and are subsequently transferred by shift register operation into CCD shift register 7. The charge packets may be introduced into CCD shift register 6 serially in time through its input end, or they may be introduced parallelly in time into the respective charge transfer stages of register 6. In an imager the charge packets may be introduced into the respective charge transfer stages of CCD shift register 6 by photoconversion in those stages responsive to the elements (pixels) of a light image irradiating those stages.

As previously alluded to, the nature of the cascade connection is such that charge packets are transferred out of the output end of CCD register 6 into the input end of CCD register 7. This transfer of charge packets is to be made without changing the quantity of charge in any of the charge packets being transferred, avoiding the merger of successive charge packets, for example. To this end, the clocking signals supplied from generator 15 to CCD shift registers 6 and 7, which clocked signals are cyclically repeating in nature, have the same length of cycle in terms of time duration; and their cycles are synchronized in a particular phasing respective to each other. In these regards operation is similar to prior art operation of synchronously forward clocked, cascaded CCD shift registers. The departure from the prior art is that the forward clocking signal supplied from generator 5 to the first CCD shift register 6 has a number m of phases successive in time greater than a number n of phases successive in time which generator 5 supplies to the second CCD shift register 7. This has been found to be possible if the phasing between the clocking signals supplied to shift registers 6 and 7 is appropriately chosen, as will be more particularly described further on in this specification.

Figure 2:
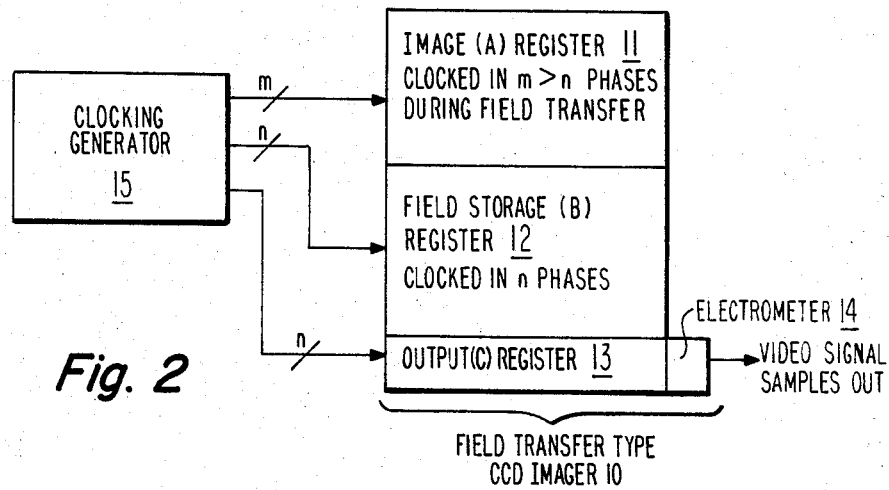
FIG. 2 is a block diagram of a field transfer type of imager embodying the invention, wherein during field transfer the image register is forward clocked in a greater number of clocking signal phases than the field storage register.

FIG. 2 shows a CCD imager 10 of field transfer type having an image (or A) register 11 and field storage (or B) register 12. Per conventional construction of a field transfer CCD imager, image register 11 comprises a plurality of parallelled charge transfer channels (not specifically shown, but which would extend from top to bottom of the register as illustrated in FIG. 2), and field storage register 12 comprises a like-numbered plurality of parallelled charge transfer channels with respective input ends connected to the output ends of corresponding charge transfer channels in image register 11. The charge transfer channels in field storage register 12 and a succeeding output line (or C) register 13 are shielded from irradiation that would generate charge carriers through photoconversion. The charge transfer channels in image register 11 are irradiated over substantial portions of their lengths by imaged light, and elements of the light image (pixels) are photoconverted to charge packets in the respective charge transfer stages successively arranged in those charge transfer channels. This irradiation takes place over image integration intervals which conventionally extend over the field trace time of video signals generated from the output signal samples from imager 10. During image integration intervals dynamic clocking of the image register 11 is halted, and static clocking signal voltages are maintained on the gate electrodes crossing over the charge transfer channels of image register 11. These static clocking signal voltages maintain potential barriers at selected intervals in the charge transfer channels to define the boundaries of pixels. The in-channel potential barriers are induced under selected gate electrodes receiving less positive phases of clocking voltage than the remaining gate electrodes under which the photocharge generated in response to light image elements is accumulated.

Field transfer intervals are interspersed among successive image integration intervals and are arranged to occur within the field retrace times of video signals generated from the output signal samples from imager 10. During each of these field transfer intervals, relatively high rate forward clocking signals are applied to both the image register 11 and field storage register 12, to transfer the charge packets representative of image element intensity, which charge packets have accumulated at positions in the charge transfer channels of image register 11 during the preceding image integration interval, into corresponding positions in the charge transfer channels of field storage register 12. That is, the image register 11 and field storage register 12 receive dynamic clocking signals cyclic at the same relatively high forward clocking rate, as in prior art field transfer CCD imagers.

The departure from prior art practice is that clocking generator 15 supplies dynamic clocking signals to image register 11 in a number m of successive phases during field transfer intervals which exceeds the number n of successive phases of clocking signal clocking generator 15 supplies to field storage register 12. The timing of these m-phase and n-phase clock signals that will allow the transfer of charge packets without disturbing their information content as to pixel intensity will be explained further on in the specification.

During the field trace time following a field transfer interval, dynamic clocking of the image register 11 is discontinued and static clocking conditions are reimposed on image register 11. Dynamic n-phase clocking of field storage register 12 continues at a relatively slow rate, charge packets being advanced a line at a time through field storage register 12 each line retrace interval, per conventional operation. The line of charge packets transferred out of the output end of field storage register 12 is entered parallelly-in-time into respective ones of the successive charge transfer stages in the charge transfer channel of output line register 13, receptive of static clocking signal. During each subsequent line trace interval, line register 13 is dynamically clocked at pixel scan rate to operate as a shift register to transfer charge packets serially in time to an electrometer 14, or other output stage configuration, to provide output signal samples of video signal. That is, during field trace operation of field storage register 12, output line register 13 and the output stage following register 13 is substantially the same as in prior-art field-transfer CCD imagers.

Figure 3:
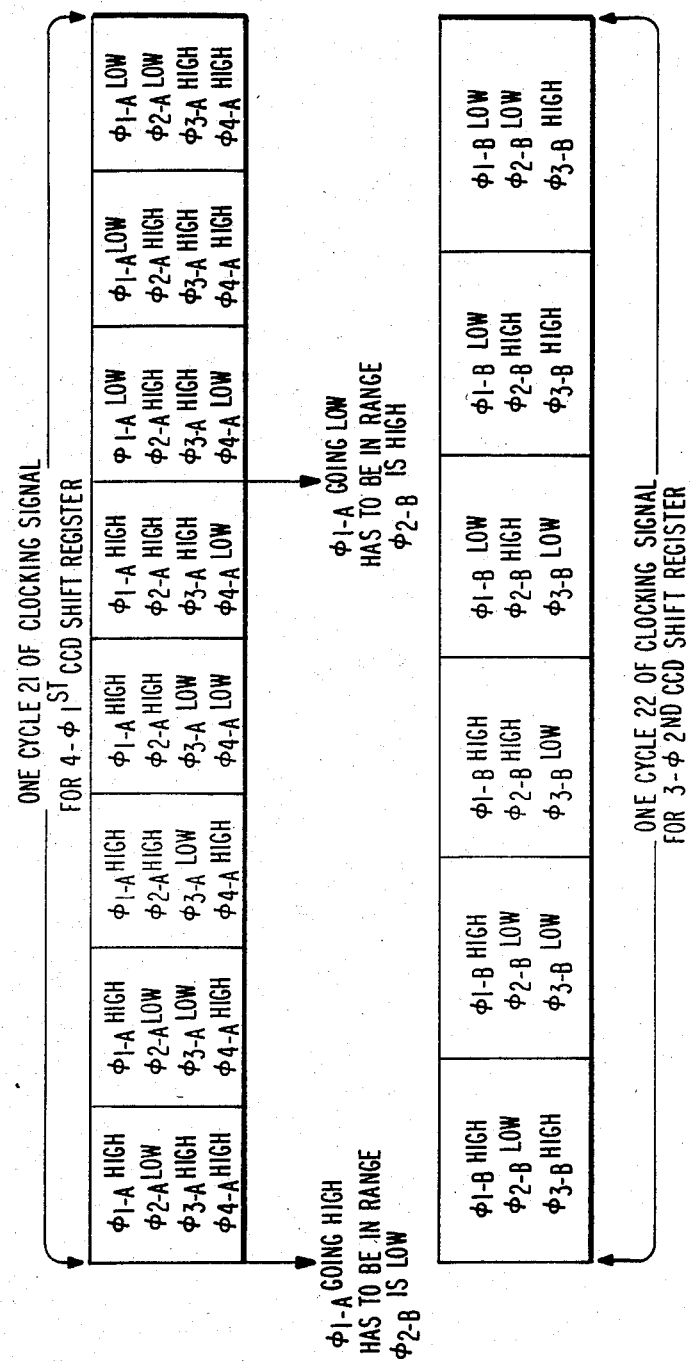
FIG. 3 is a timing diagram showing the range of respective clocking signal phases permissible when forward clocking a four-phase CCD shift register followed in cascade connection by a three-phase CCD shift register in accordance with the invention, wherein one avoids destroying the information contained in charge packets transferred from the four-phase CCD shift register to the three-phase one.
Figure 3:
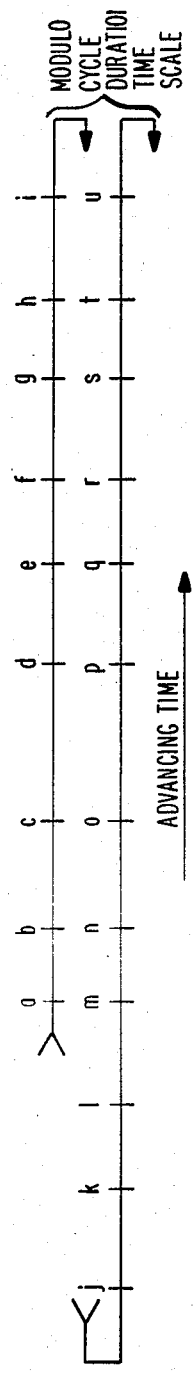

FIG. 3 timing diagram shows a cycle 21 of the four-phase clocking signal that may be used in a first CCD shift register serially transferring charge packets into a second CCD shift register. FIG. 3 also shows an equal-duration cycle 22 of the three-phase clocking signal that may be applied to the second CCD shift register in accordance with the invention. Equality of duration of the cycles of first CCD shift register clocking signal and of second CCD shift register clocking signal is a first requirement which must be placed on the forward clocking of charge packets through the two shift registers. The requirement arises because on every clock cycle time a charge packet must be transferred from the first CCD shift register to the second in order to avoid any pile-up of successive charge packets in the first CCD shift register.

A second requirement on forward clocking through the two shift registers is that when the final gate electrode of the first CCD shift register goes relatively low in voltage to errect a potential energy barrier in the portion of the charge transfer channel therebeneath, the initial gate electrode of the second CCD shift register is relatively high in voltage so as to have induced a full-depth potential energy well thereunder to receive charge displaced from the first CCD shift register. A third requirement on forward clocking through the two shift registers is that when the final electrode of the first CCD shift register goes relatively high in voltage, the initial gate electrode of the second CCD shift register must have previously gone relatively low in voltage to prevent charge flowing back from the second CCD shift register into the first CCD shift register. This third requirement restricts the range of possible phasings between the four-phase first CCD shift register clocking cycle and the three-phase second CCD shift register clocking cycle more than the second requirement does.

While the phasing of these clocking cycles may be displaced to any degree within the second range, it is convenient in terms of simplifying the design of the clocking generator to make every fourth one of the eight transitions per cycle of the four-phase clocking signal to occur simultaneously with every third one of the six transitions per cycle of the three-phase clocking signal. Then all transitions in both clocking signals can be timed with reference to transitions in a master clock oscillator operated at a frequency twelve times the reciprocal of cycle time, or a harmonic of that frequency, through the use of frequency division. Frequency division is easily carried forward by digital counting of master clock oscillator average-axis-crossings, for example.

At the bottom of FIG. 3 is a folded time scale showing several successive cycles of clocking with consecutive times a-u indicated thereon. These times a-u are times at which occur the in-channel potential energy profiles shown in subfigures of FIG. 4 with corresponding alphanumeric identifications a-u.

Figure 4A:
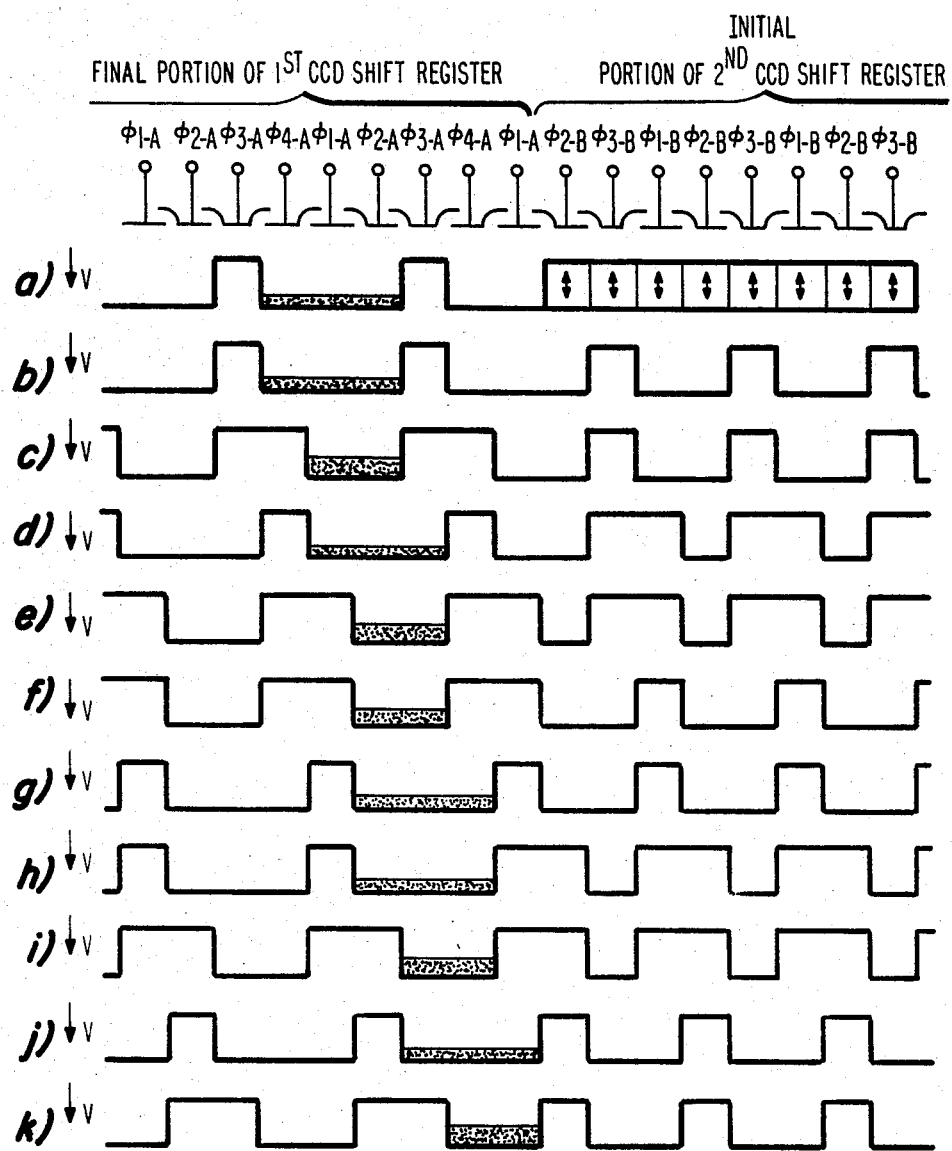
FIGS. 4A and 4B are a succession of in-channel potential profiles illustrative of a preferred one of those permissible forward clocking processes, in accordance with the invention.
Figure 4B:
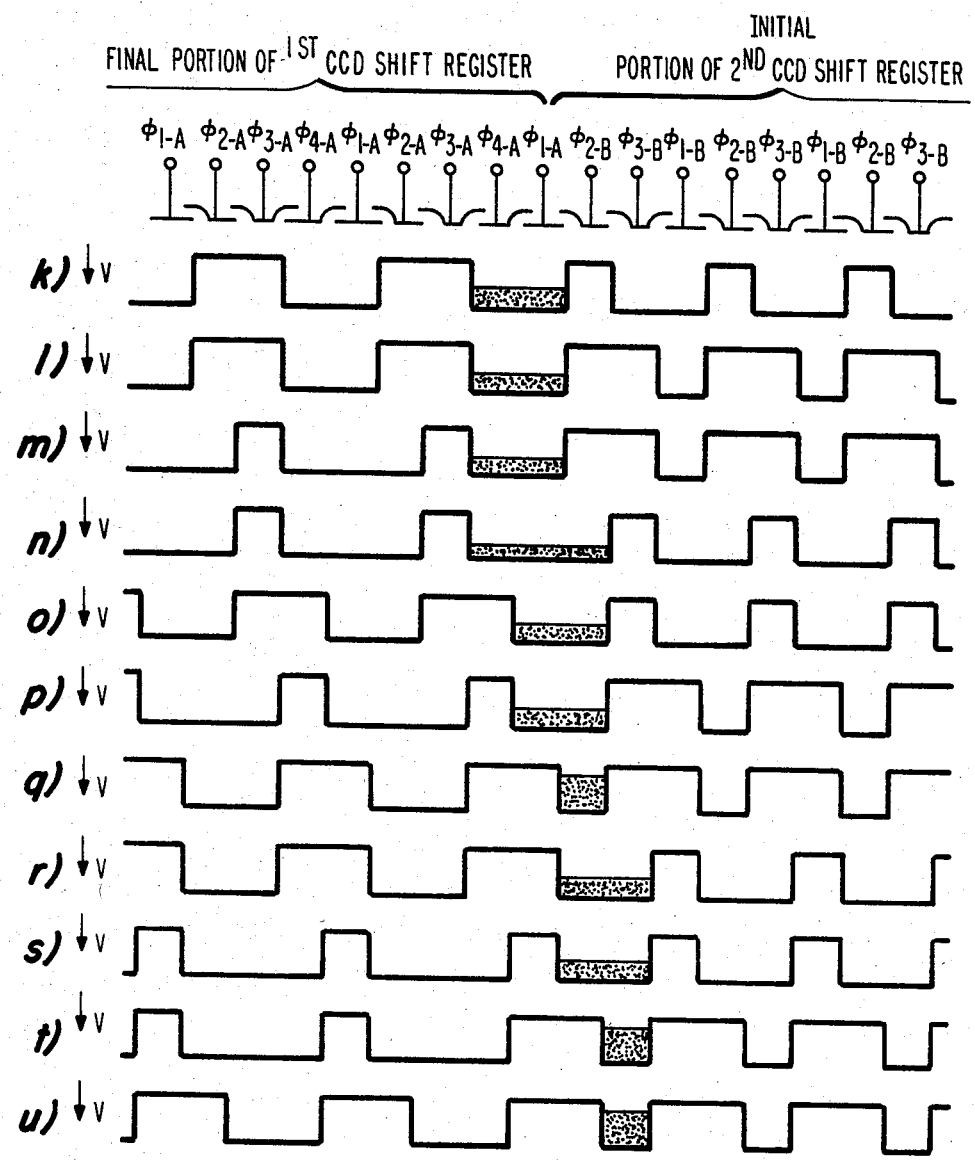

The FIGS. 4A and 4B in-channel profiles are for the first CCD shift register, which may be assumed to be one of the charge transfer channels of FIG. 2 image register 11, and for the second shift register, which may be assumed to be the following one of the charge transfer channels of FIG. 2 field storage register 12. These assumptions are made, so that the line interlace between alternate fields can be considered referring to FIGS. 4A and 4B. During alternate fields the potential energy barriers defining pixel boundaries will be erected under the $\phi_{3\text{-}A}$ gate electrodes by making $\phi_{3\text{-}A}$ relatively negative (low) respective to the relatively positive (high) $\phi_{1\text{-}A}$, 100 $2\text{-}A$, and $\phi_{4\text{-}A}$ gate electrodes of the first CCD register in the image register 11. This is the first CCD register static clocking condition shown in FIG. 4A, potential energy profile (a). The dynamic clocking of the second CCD shift register in field storage register 12 causes clocking voltages to range from high to low conditions. The charge packet descriptive of the first full pixel is shown in stipple to facilitate the reader keeping track of the transfer of charge from the first to the second CCD shift register as dynamic clocking of the first CCD shift register is resumed during field transfer. The sequential steps in the initial portion of this field transfer process are diagrammed by the in-channel potential energy profiles (b)-(u) shown in FIGS. 4A and 4B.

In the other set of alternate fields, in order to secure line interlace the potential barriers defining pixel boundaries will be erected under the $\phi_{1\text{-}A}$ gate electrodes by biasing them low compared to the $\phi_{2\text{-}A}$, $\phi_{3\text{-}A}$, and $\phi_{4\text{-}A}$ gate electrodes. So when dynamic clocking of the first CCD shift registers in image register 11 is resumed, the initial step in the field transfer clocking sequence will be as shown in FIG. 4A, potential energy profiles (g), with the forward clocking sequence continuing on from that step then per (h)-(u) in FIGS. 4A and 4B.

Figure 5:
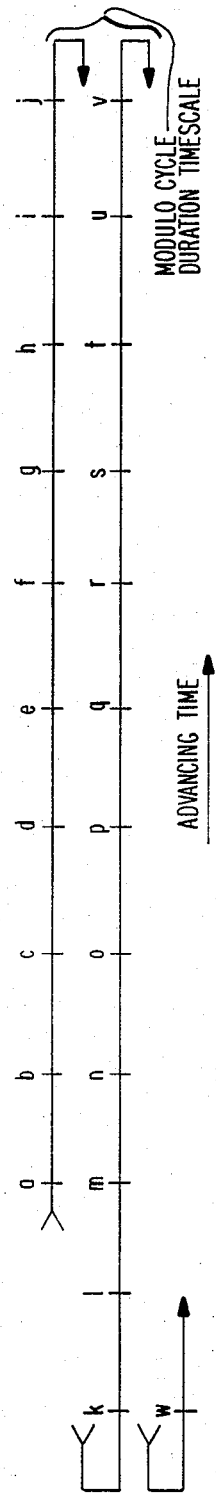
FIG. 5 is a timing diagram showing the range of respective clocking signal phases permissible when forward clocking a six-phase CCD shift register followed in cascade connection by a three-phase CCD shift register in accordance with the invention, wherein one avoids destroying the information contained in charge packets transferred from the six-phase CCD shift register to the three-phase one.
Figure 6:
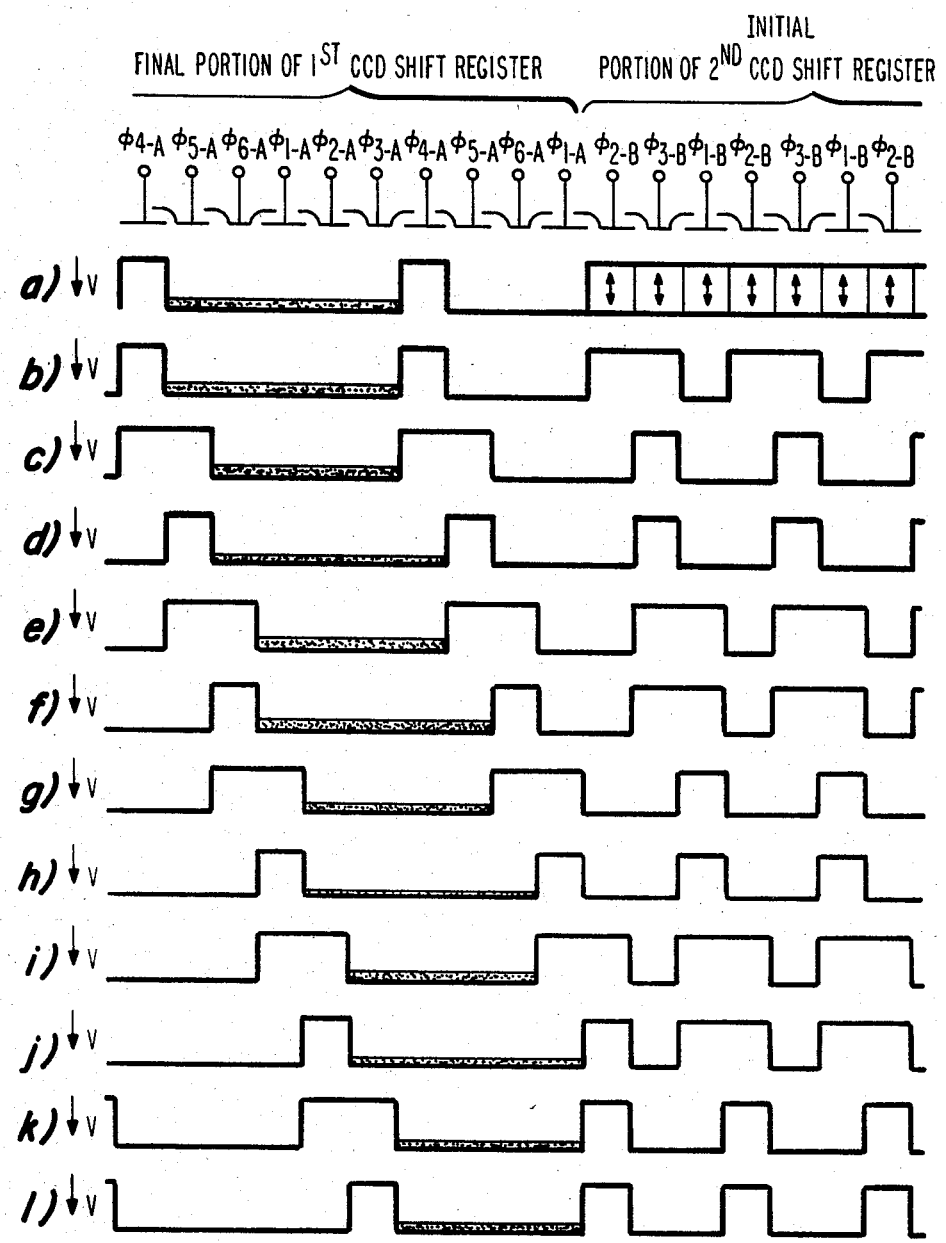
FIGS. 6A and 6B are a succession of in-channel potential profiles illustrative of a preferred one of those permissible forward clocking processes, in accordance with the invention.
Figure 6B:
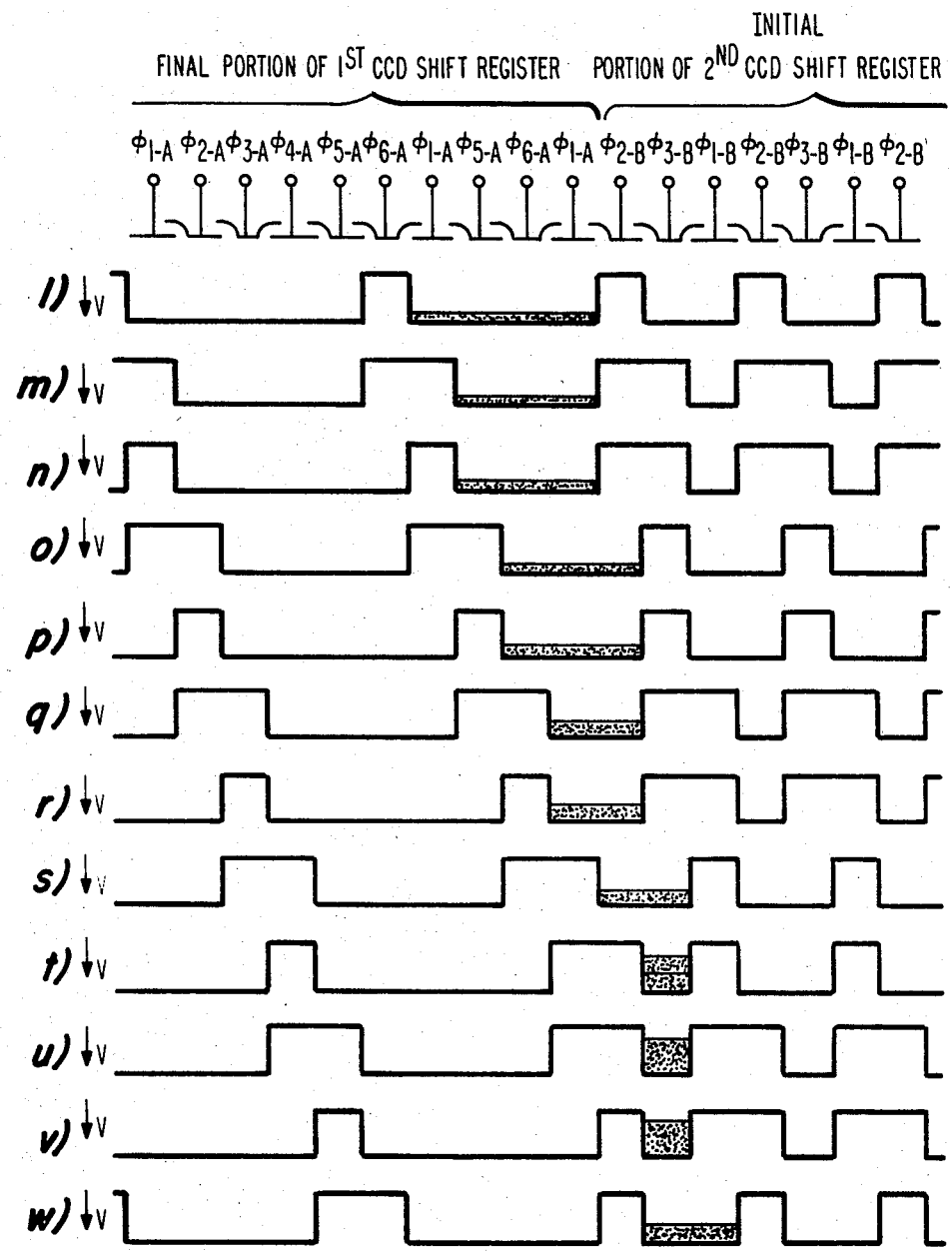

FIGS. 5, 6A and 6B illustrate the operation of a six-phase forward-clocked first CCD shift register followed in cascade connection by a three-phase forward-clocked second CCD shift register, which illustration corresponds to that provided by FIGS. 3, 4A and 4B for a four-phase forward-clocked first CCD shift register followed in cascade by a three-phase forward-clocked second CCD shift register. FIG. 6A, potential energy profiles (a) shows in-channel potential barriers being induced under the $\phi_{4-A}$ gate electrodes during image integration times, responsive to $\phi_{4-A}$ gate electrodes being relatively low in voltage compared to $\phi_{1-A}$, $\phi_{2-A}$, $\phi_{3-A}$, $\phi_{5-A}$ and $\phi_{6-A}$ gate electrodes. FIGS. 6A and 6B potential energy profiles (b)–(w), show the initial portion of field transfer time when six-phase dynamic clocking is restored in the first CCD shift register. Where line interlace is used on alternate fields, the resumption of dynamic clocking of the first CCD shift register will proceed from the in-channel potential energy profile (h) shown in FIG. 6A, continuing through the remaining potential energy profiles (i)–(w), etc., of FIGS. 6A and 6B.

Forward-clocking a six-phase-clocked first CCD shift register together with a three-phase-clocked second CCD shift register is attractive in that all clocking signal transitions in the second CCD shift register occur simultaneously with clocking signal transitions in the first CCD shift register. This reduces any problems with clock coupling between shift registers through the substrate, and it simplifies the generation of the lower rate clocking signals by pulse-rate division. If one uses non-uniform duration three-phase clocking signals to forward clock a second CCD shift register receptive of charge packets transferred from a four-phase-clocked first CCD shift register, these advantages can also be obtained.

Figure 7:
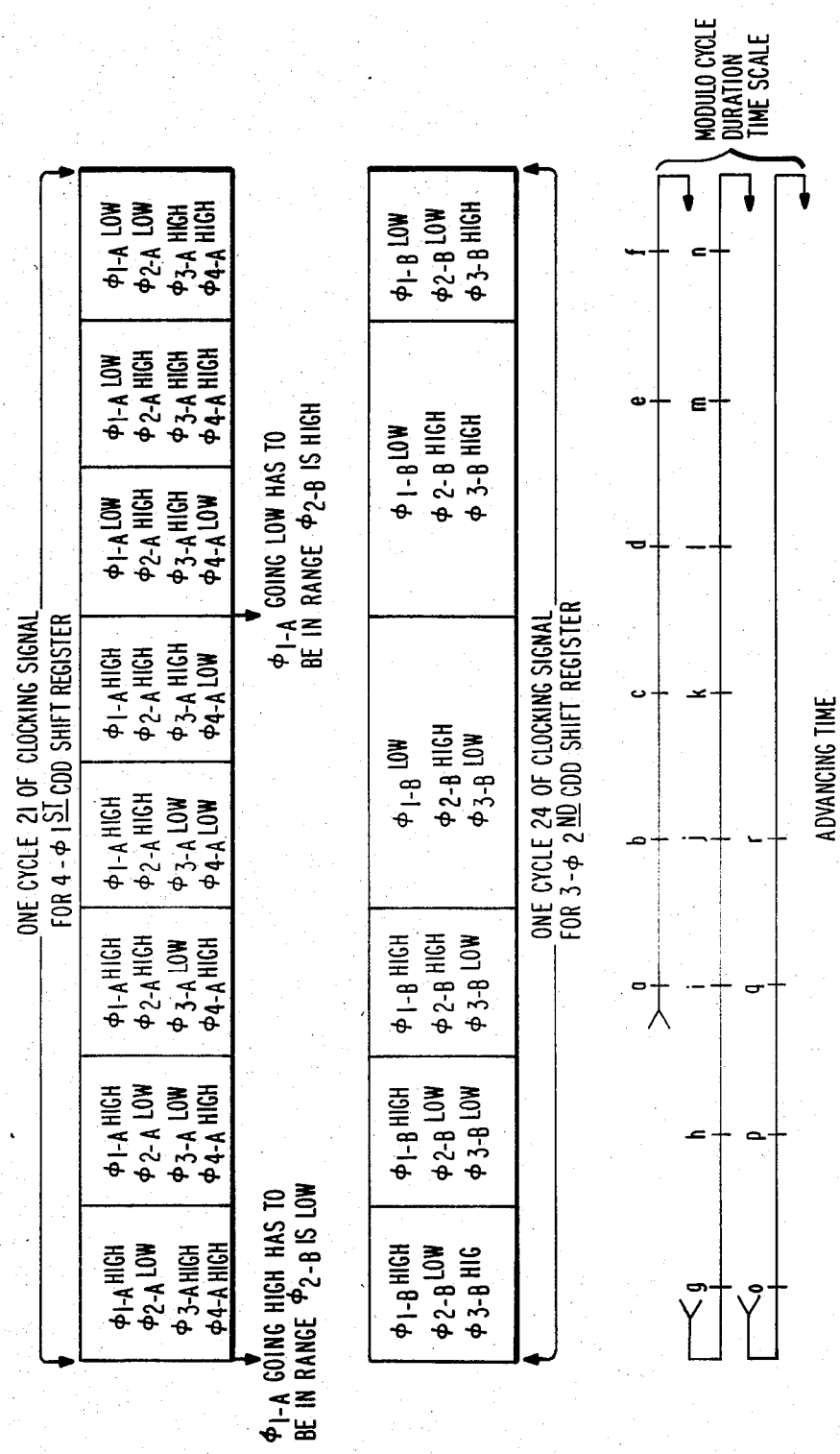
FIG. 7 is a timing diagram showing a way alternative to that of FIG. 3 for forward clocking a four-phase CCD shift register followed in cascade by a three-phase CCD shift register, in accordance with the invention.
Figure 8:
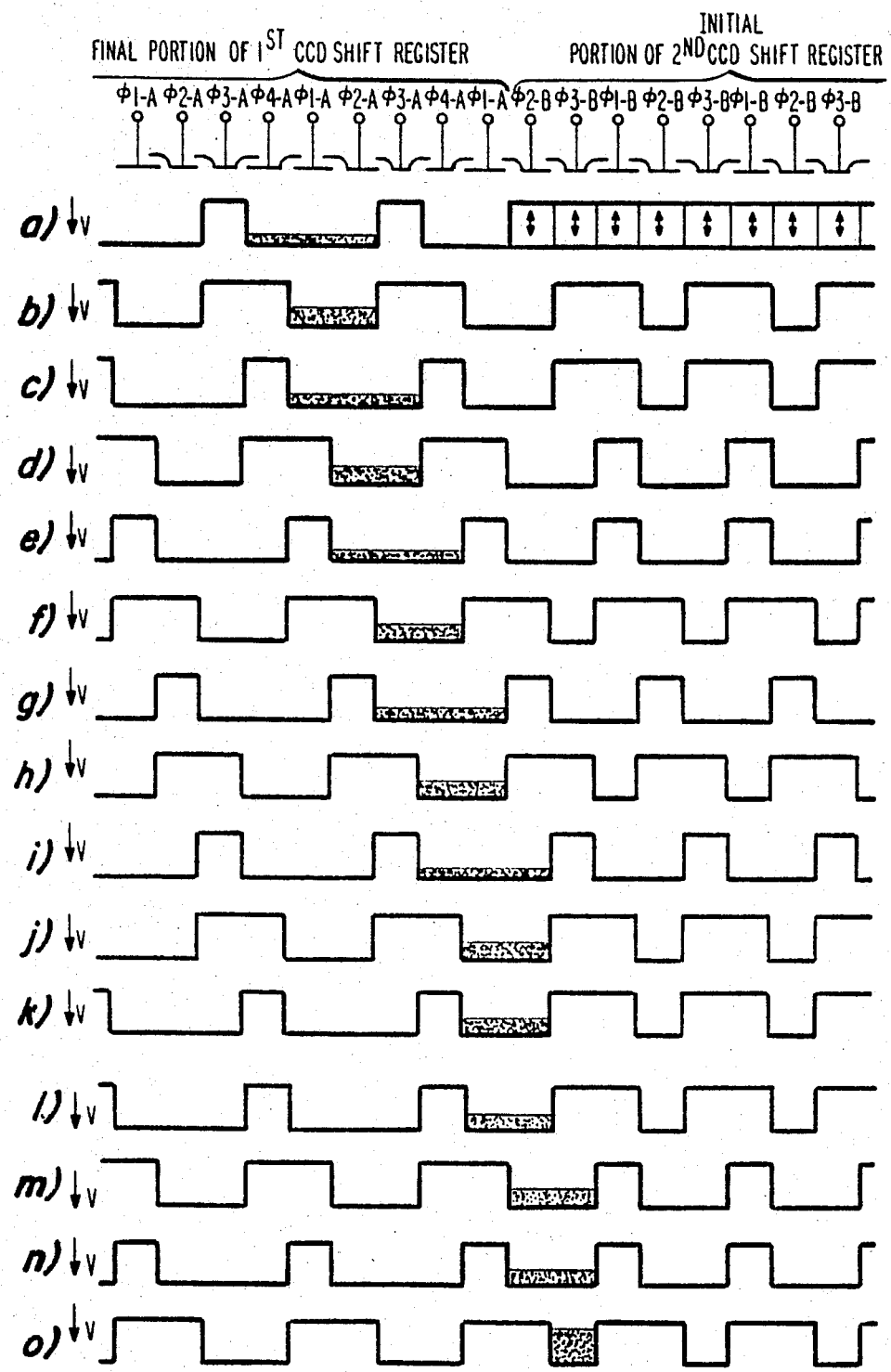
FIG. 8 is a succession of in-channel potential profiles illustrative of one of the forward clocking processes indicated in FIG. 7 to be a permissible embodiment of the invention.

FIG. 7 is a timing diagram showing such a modified cycle 24 of three-phase clocking for the second CCD shift register. FIG. 8 shows illustrative inchannel potential energy profiles when a modified cycle 24 of three-phase clocking for the second CCD shift register is used together with cycle 21 of four-phase clocking for the first CCD shift register.

What is claimed is:

1. In Combination:
a first CCD shift register comprising a charge transfer channel with input and output ends and a plurality of gate electrodes crossing over said charge transfer channel, said gate electrodes consecutively ordinally numbered first through $m^{th}$ within consecutive cycles of m successive gate electrodes, from input to output ends of the charge transfer channel of said first CCD shift register, m being a positive integer greater than another positive integer n;

a second CCD shift register comprising a charge transfer channel with input and output ends and a plurality of gate electrodes crossing over said charge transfer channel, said gate electrodes consecutively ordinally numbered first through $n^{th}$ within consecutive cycles of n successive gate electrodes, from input to output ends of the charge transfer channel of said second CCD shift register;

a connection of the output end of the charge transfer channel of said first CCD shift register to the input end of the charge transfer channel of said CCD shift register; and means for generating first and second clocking signals of the same periodicity, said first clocking signal having m phases ordinally numbered first through $m^{th}$ respectively applied to gate electrodes of said first CCD register having the same ordinal numbering as the phase so applied, said second clocking signal having n phases ordinally numbered first through $n^{th}$ respectively applied to gate electrodes of said second CCD register having the same ordinal numbering as the phase so applied, selected phases of said first and second clocking voltages being arranged to overlap in time in such phasing as to avoid merger of successive charge packets at said connection of the output end of the charge transfer channel of said first CCD shift register to the input end of the charge transfer channel of said second shift register.

2. In a CCD imager of field transfer type having an image register, a field storage register and an output register, wherein said image register and field storage registers are clocked with first and second clocking signals of like periodicity to transfer charge packets from positions in said image register to corresponding positions in said field storage register during recurrent field transfer intervals, the improvement wherein said image register is clocked in a greater number of phases during field transfer intervals than said field storage register is.

3. An improved CCD imager of field storage type as set forth in claim 2 provided with line interlace between alternate field transfer intervals.

* * * * *